Patented Feb. 16, 1932

1,845,224

UNITED STATES PATENT OFFICE

GIAN ALBERTO BLANC, OF ROME, ITALY

METHOD FOR THE SEPARATION OF ALUMINUM NITRATE FROM POTASSIUM, SODIUM, IRON, CALCIUM, MAGNESIUM NITRATES, PRESENT IN MIXED SOLUTIONS OF THESE SALTS

No Drawing. Application filed January 15, 1926, Serial No. 81,590, and in Italy January 28, 1925.

My invention relates to a method of separating aluminum nitrate from potassium, sodium, iron, calcium, magnesium nitrates, present in mixed solutions of these salts.

The patent application No. 508,807 of October 19, 1921, describes a method of separating aluminum chloride from potassium chloride, iron chloride and the like present in mixed solutions of these salts such as are obtained, for example, by treating leucite with hydrochloric acid.

This method is based on the property of aluminum chloride of being practically insoluble in sufficiently concentrated solutions of hydrochloric acid, whereas chlorides of potassium, iron and the like chlorides of all the other elements which are found associated with aluminum in nature, such as for example calcium, magnesium, sodium and the like are soluble.

The present invention utilizes a similar property of aluminum nitrate on the one hand, and potassium, sodium, calcium, magnesium, iron nitrates on the other hand, in the presence of nitric acid of a high concentration for effecting an easy separation of aluminum nitrate from mixtures of the other above mentioned nitrates. Practically the precipitation of the aluminum nitrate will be completely effected when a concentration of 60–70% in nitric acid has been reached.

These highly concentrated mixtures of nitrates having a slight excess of nitric acid are obtained by the action of nitric acid on minerals consisting of aluminum and potassium, or of aluminum and calcium, sodium, magnesium, which generally also contain iron as an impurity. When as a result of such action, the mixed solution of aluminum nitrate and of one or more nitrates of the other above-mentioned elements is obtained, it is sufficient to increase the acidity of the solution by the addition of nitric acid in order to initiate a crystallization—which is more or less complete according to the degree of acidity—of the aluminum nitrate, the other nitrates remaining in solution. In particular, in the case of leucite (potassium-aluminum silicate containing iron as impurity) aluminum nitrate is obtained by crystallization, whilst the potassium and iron nitrates remain in solution.

I claim:

The method of separating aluminum nitrate from the mixed solutions of nitrates obtained by the treatment of minerals, e. g. leucite and the like, containing aluminum in conjunction with other alkali metals or alkaline earth metals, which consists in adding to the solution concentrated nitric acid, thereby increasing its acidity to such a point that the entire aluminum nitrate will crystallize.

In testimony whereof I have affixed my signature this 31st day of December, 1925.

GIAN ALBERTO BLANC.